United States Patent Office 3,496,228
Patented Feb. 17, 1970

3,496,228
AMINOTRICYCLONONANES AND THE SALTS THEREOF
John R. E. Hoover, Glenside, Pa., assignor to Smith Kline & French Laboratories, Philadelphia, Pa., a corporation of Pennsylvania
No Drawing. Continuation-in-part of application Ser. No. 519,953, Jan. 11, 1966. This application Feb. 16, 1967, Ser. No. 616,491
Int. Cl. C07c 87/40
U.S. Cl. 260—563                7 Claims

ABSTRACT OF THE DISCLOSURE 3 and 9 - amino and aminomethyltricyclo[3.3.1.0$^{3,7}$] nonanes and 1-amino and aminomethyltricyclo[3.3.0.0$^{3,7}$] octanes prepared by a sequence of reactions from 1,3-dibromotricyclo[3.3.1.1$^{3,7}$]decane-9,10-dione. The products are antiviral agents.

---

This application is a continuation-in-part of copending application Ser. No. 519,953, filed Jan. 11, 1966 now abandoned.

This invention relates to new chemical compounds having antiviral activity. In particular, the invention relates to tricyclo[3.3.1.0$^{3,7}$]nonanes and tricyclo[3.3.0.0$^{3,7}$]octanes, substituted with an amino or aminomethyl group.

The compounds of the invention are characterized by the following structural formulas:

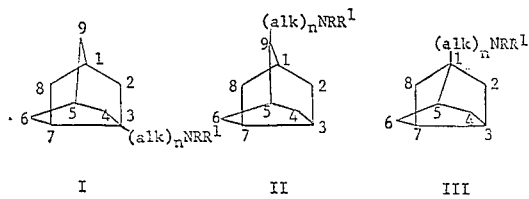

wherein:

R is hydrogen, lower alkyl, or lower acyl;
R$^1$ is hydrogen or lower alkyl;
$n$ is 0 or 1;
alk is CH$_2$,

or

and
R$^2$ is lower alkyl of 1 to 4 carbon atoms.

For purposes of the present invention, the terms lower alkyl and lower acyl, unless otherwise defined, are intended to represent those alkyl and acyl groups having up to about seven carbon atoms therein, particularly methyl, ethyl, butyl, pentyl, acetyl, and butyryl.

Compounds of Formulas I and II are named as 3 and 9 - amino or 3 and 9-aminomethyl tricyclo[3.3.1.0$^{3,7}$] nonanes, respectively. Compounds of Formula III are named as 1-amino or 1-aminomethyl tricyclo[3.3.0.0$^{3,7}$] octanes. They may also be named as tricyclooctane or nonane amines or methyl amines.

The preferred compounds of the invention are those of Formulas I–III in which $n$ is 0 or 1 and alk is CH$_2$ or

Also preferred are those compounds of Formulas I–III in which R and R$^1$ are hydrogen or methyl and R$^2$ is methyl.

The processes for preparing certain of the compounds of this invention, i.e. those in which $n=0$ are illustrated below:

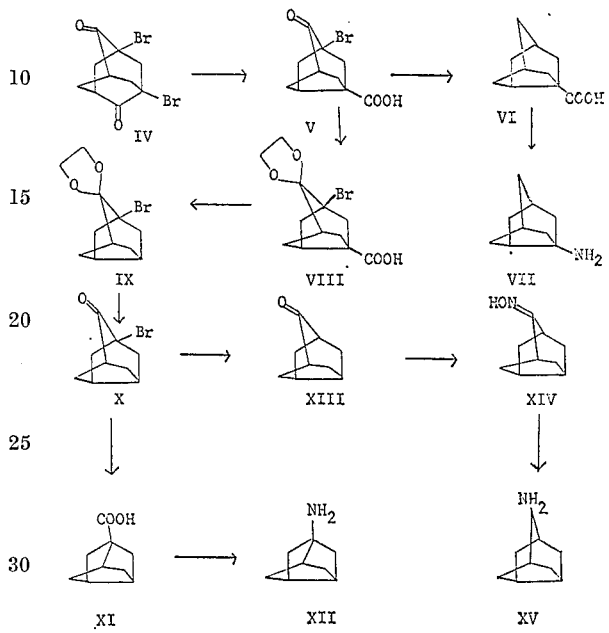

1,3 - dibromotricyclo[3.3.1.1$^{3,7}$]decane - 9,10 - dione (IV) [J. Org. Chem. 29, 3103 (1964)] is treated with an alkanol such as ethanol and a strong base such as potassium hydroxide to give the partially rearranged bromo keto acid V. This compound is reduced with zinc amalgam in refluxing hydrochloric acid. The resulting tricyclononane-3-carboxylic acid (VI) is useful for preparing amino compounds in which $n$ is either 0 or 1, as will be described hereinbelow. Compound VI is converted to an acid halide with a reagent such as thionyl chloride, and then to the corresponding azide by treatment of the acid halide with a metal azide such as sodium azide. The azide is then refluxed in a solvent such as benzene or toluene to convert the azide to the isocyanate. Hydrolysis of the azide with a strong acid such as hydrochloric gives the 3-aminotricyclononane VII.

For the preparation of compounds of Formula I in which $n$ is 1 and alk is CH$_2$, the acid VI is converted to the acid halide, and this compound is treated with ammonia to give the corresponding amide. Reduction of the amide with lithium aluminum hydride gives the 3-aminomethyltricyclononane. Use of primary or secondary amines instead of ammonia gives N-substituted aminomethyl compounds. Alternatively, the acid is reduced to the methanol with lithium aluminum hydride or diborane, the alcohol is converted to the bromide by reaction with hydrogen bromide or phosphorus tribromide, and the aminomethyl compound prepared by reaction with ammonia. Compounds in which $n$ is 1 and alk is

are prepared by treating the above acid chloride with methyl magnesium bromide to give the α,α-dimethylmethanol. Treatment with acetonitrile and sulfuric acid in a Ritter reaction gives the α,α-dimethyl-N-acetylmethylamine, which is hydrolyzed with a strong base such as potassium hydroxide to the α,α - dimethylmethylamine. Compounds is which alk is

are prepared by treating the carboxylic acid VI with methyl lithium or another lower alkyl lithium to give the methyl ketone. The oxime is prepared by reaction with hydroxylamine, and the oxide is then reduced with lithium aluminum hydride or catalytically.

Compounds of Formula III in which $n$ is 0 are prepared by first converting the bromo keto acid V to its corresponding ketal VIII. The carboxyl group is then eliminated by conversion to its acid chloride, reaction of the acid chloride with tert-butyl hydroperoxide to give the perester, and heating, preferably in a solvent such as cumene, to give the decarboxylated bromo ketal IX. The ketal is hydrolyzed to the ketone X with acid, the bromo ketone is then contracted with potassium hydroxide in ethanol to give the acid XI, and the carboxyl group is converted to an amino group to give compound XII via the azide as described above.

Compounds of Formula III in which $n$ is 1 are prepared, as described above, by converting the carboxylic acid to the amide and then reducing the amide to the aminomethyl compound, carrying out the Grignard, Ritter, and hydrolysis reactions to give the α,α-dimethylmethylamine, or reacting the carboxylic acid with a lower alkyl lithium, preparing the oxime, and then reducing the oxime to give an α-alkylmethylamine.

Compounds of Formula II in which $n$ is 0 are prepared by first debrominating the bromo ketone X with zinc amalgam in acetic acid. The resulting ketone XIII is converted to its oxime XIV, and the oxime reduced to the amine XV with lithium aluminum hydride.

Compounds of Formula II in which $n$ is 1 and alk is $CH_2$ are prepared by treating the ketone XIII with methoxymethylene triphenylphosphorane, generated from methoxymethyl triphenylphosphonium chloride and butyl lithium in solvents such as tetrahydrofuran and diglyme. The resulting 3-methoxymethylene compound is then converted to a 3-carboxaldehyde by means of a strong acid such as perchloric acid. The aldehyde is then treated with hydroxylamine hydrochloride to form an oxime, and the oxime is reduced to the aminomethyl compound with a reagent such as lithium aluminum hydride. Compounds in which $n$ is 1 and alk is

are prepared by oxidizing the aldehyde to the carboxylic acid with silver nitrate, converting the acid to the acid chloride with a reagent such as thionyl chloride, and performing the series of reactions as described above. Compounds in which alk is

are also prepared by procedures already described.

The unsubstituted amines of Formulas I–III in which R and $R^1$ are hydrogen are converted to their alkyl or acyl derivatives by methods well-known to the art, such as alkylation with lower alkyl halides or sulfates and acylation with acyl halides or anhydrides. Dilower alkylamino compounds are prepared by acylating an alkylamine, and then reducing the acylalkylamine with a reagent such as lithium aluminum hydride. A methylamino compound is prepared by reaction of methanol with an isocyanate, followed by reduction of resulting carbamate with lithium aluminum hydride. A dimethylamino compound it prepared by heating the corresponding amino compound with formic acid and formaldehyde solution.

Among the pharmaceutically acceptable acids which may be used to form salts of the amino products are hydrochloric, sulfuric, hydrobromic, citric, pamoic, maleic, cyclohexylsulfamic, nitric, acetic, tartaric, and succinic acids. Such salt formation is well konwn to the art.

The antiviral compounds of the invention are used for the purpose of inhibiting and combatting the effects of viruses, particularly influenza viruses. They are administered orally or parenterally in the form of aqueous solutions of their pharmaceutically acceptable acid addition salts, preferably the hydrocloride, in doses of approximately 5–50 mg./kg., preferably 25 mg./kg.

The preferred compound of the invention tricyclo [3.3.1.0$^{3,7}$]nonane-3-amine, has been found to prolong the survival time of mice infected with influenza $A_2$, Ann Arbor strain and influenza A, Swine strain, up to 85%, when administered at subcutaneous doses of 25–100 mg./kg. They are formulated for use in the conventional manner.

Compounds of Formula III in which $n$ is 0 may alternatively and preferably be prepared by treating the silver salt of the bromo keto acid V with bromine in carbon tetrachloride to give the dibromoketone XVI. This compound is then treated with aqueous alcoholic

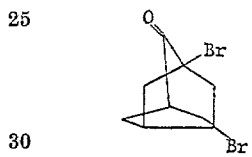 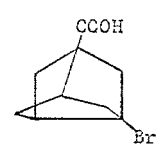

XVI                          XVII potassium hydroxide to give the Favorskii product XVII. Debromination with lithium in tetrahydrofuran and tert-butanol gives the carboxylic acid XI, which is converted to the amine XII as described above.

The following examples are intended to illustrate the preparation of the compounds of the invention. Various modifications in the compounds and in the processes for preparing them which are obvious to those skilled in the art of organic chemistry are intended to be part of the invention.

EXAMPLE 1

1-bromo-9-ketotricyclo[3.3.1.0$^{3,7}$]nonane-3-carboxylic acid

To a suspension of 1,3-dibromotricyclo[3.3.1.1$^{3,7}$]decane-9,10-dione (215 mg.) in ethanol (2 ml.) and water (0.5 ml.) at 0° C. is added potassium hydroxide (0.3 g.). After five minutes the stirred solution is removed from the ice bath and stirring is continued at room temperature for two hours. The solution is then acidified and allowed to stand at room temperature overnight. Chloroform is added and the organic phase is then washed with water, dried with sodium sulfate and filtered. The solvent is evaporated and the residue is crystallized from acetonitrile. Recrystallization from the same solvent affords the title product.

EXAMPLE 2

Tricyclo[3.3.1.0$^{3,7}$]nonane-3-carboxylic acid

The bromo keto acid of Example 1 (400 mg.) is reduced with zinc amalgam (4.72 g.) in refluxing conc. hydrochloric acid (6.30 ml.) for 2 hours. The solution is cooled to room temperature and water (20 ml.) is added. The zinc is filtered off and the solution is extracted with ether (5×100 ml.). The ether extracts are dried over sodium sulfate, and the solvent is evaporated. The residue is dissolved in acetonitrile and the acid is precipitated as the cyclohexylamine salt. The salt is suspended in a mixture of ether and water and excess hydrochloric acid is added. The aqueous phase is extracted several times with ether and the combined ether extracts are dried over sodium sulfate. The ether solution is concentrated in vacuo and the acid is chromatographed on silica gel using ether. The acid, obtained upon evaporation of the ether solution, is recrystallized from acetonitrile.

EXAMPLE 3

3-tricyclo[3.3.1.0$^{3,7}$]nonylamine

The tricyclic acid of Example 2 (1.0 g.) is dissolved in dry ether (40 ml.) and treated with thionyl chloride (0.88 ml.) in the presence of pyridine (1 drop). After stirring at room temperature for one hour, the solution is refluxed for twenty minutes. The solvent is then evaporated and residual thionyl chloride is removed by distillation on a rotary evaporator with several portions of benzene. The acid chloride is then cautiously vacuum dried for thirty minutes. The residue is dissolved in dry acetone (46 ml.) and the solution is cooled to ca. 3°. Sodium azide (0.45 g.) in water (4.5 ml.) is then added to the stirred reaction mixture. After twenty minutes the solution is poured into ice water (100 ml.) and the aqueous phase is extracted with toluene (4×50 ml.). The combined organic extracts are washed with cold water and then dried with anhydrous sodium sulfate. The solution is filtered and then heated at reflux for two hours under a nitrogen atmosphere. The solvent is removed in vacuo on a rotary evaporator and the residue is refluxed in a solution of acetone (20 ml.) and conc. hydrochloric acid (5 ml.) for one hour. The majority of the acetone is then removed on a rotary evaporator and the residue is diluted with water (25 ml.). This acidic solution is extracted with ether (2×25 ml.). It is then made alkaline and extracted three times with ether (30 ml.). The extracts are combined, washed with water (30 ml.) and dried with anhydrous sodium sulfate. After filtration, the ether solution is concentrated to a volume of ca. 30 ml. and excess ethereal hydrogen chloride is added. The precipitated hydrochloride salt of the title amine is filtered off and recrystallized from methanol-ether. The free amine may be obtained pure by fractional distillation of the ether concentrate prior to converting it to the hydrochloride.

EXAMPLE 4

1-bromo-9-ketotricyclo[3.3.1.0$^{3,7}$]nonane-3-carboxylic acid ethylene ketal

A mixture of the bromo keto acid of Example 2 (2.6 g.), ethylene glycol (0.7 g.), benzene (200 ml.) and p-toluenesulfonic acid (0.2 g.) is stirred and refluxed for one day under a Dean-Stark trap. The solution is then cooled, washed with saturated sodium bicarbonate solution, then with water and dried over sodium sulfate. After filtration, the solvent is removed and the residual product is dissolved in ethanol (50 ml.) containing potassium hydroxide (0.6 g.). The solution is refluxed under nitrogen for one hour, cooled, diluted with water (100 ml.) and acidified with acetic acid to pH 5.0. The solution is then extracted with chloroform (3×100 ml.). The organic extracts are washed with water. After drying with sodium sulfate the organic solvent is removed to give the title ketal.

EXAMPLE 5

1-bromotricyclo[3.3.1.0$^{3,7}$]nonan-9-one ethylene ketal

The acid ketal of Example 4 (3 g.) is dissolved in ether (100 ml.) and treated with thionyl chloride (4.0 ml.) in the presence of a trace of pyridine. After stirring for two hours, the solvent and excess thionyl chloride are removed by vacuum distillation leaving the desired acid chloride.

The above acid chloride (2 g.) is dissolved in dry ether (40 ml.) and added dropwise over a one hour period to a solution of t-butyl hydroperoxide (0.6 g.) and dry pyridine (0.5 g.) in dry ether (40 ml.) at −5° C. Stirring and cooling is continued for an additional hour. The mixture is poured over 6 g. of ice. The aqueous phase is separated and extracted with ether (30 ml.). The combined ether phases are washed with cold 10% sulfuric acid (2×8 ml.), followed immediately with ice water (20 ml.), then cold 10% sodium carbonate (10 ml.) and more ice water (3×10 ml.). The ether solution is dried over sodium sulfate, filtered and the solvent is removed by vacuum distillation at 30° C. The residual t-butylperoxy ester is dissolved in cumene (50 ml.) and the solution is then refluxed under nitrogen for three hours. The crude product, after removal of cumene by fractional distillation under vacuum is chromatographed on neutral alumina with benzene. The solvent is then removed to give the title bromo ketal.

EXAMPLE 6

1-bromotricyclo[3.3.1.0$^{3,7}$]nonan-9-one

The bromo ketal of Example 5 (2.59 g.) is treated with 75% aqueous sulfuric acid (25 ml.) for eight hours. The reaction mixture is cooled and then diluted with ice (200 g.). This aqueous solution is extracted with chloroform (5×150 ml.) and the chloroform extracts are washed with saturated aqueous sodium bicarbonate. After washing with water (3×200 ml.), the chloroform solution is dried with sodium sulfate, filtered, and the solvent is evaporated. The residual product is not purified further but is desiccated by refluxing with benzene (2.50 ml.) under a Dean-Stark trap until water is no longer observed to distill over. The benzene is then evaporated and the residue is recrystallized from hexane to give the anhydrous title ketone.

EXAMPLE 7

Tricyclo[3.3.0.0$^{3,7}$]octane-1-carboxylic acid

To a suspension of the bromo ketone of Example 6 (0.287 g.) in ethanol (4 ml.) and water (1 ml.) is added potassium hydroxide (0.6 g.). The resulting solution is refluxed for four hours and acidified with dilute hydrochloric acid. The solution is then diluted with water (20 ml.) and extracted with ether (7×40 ml.). The ether extracts are combined and dried with sodium sulfate. After filtration, the solvent is removed and the residue crystallized from ethyl acetate to give the desired title acid.

EXAMPLE 8

1-aminotricyclo[3.3.0.0$^{3,7}$]octane

The acid of Example 7 is converted to the hydrochloride salt of the title amine by the same procedure used in Example 3. The salt is recrystallized from methanol-ether. The free amine is obtained by treating the hydrochloride salt with excess aqueous sodium hydroxide. This aqueous solution is extracted with ether; the ether is dried with sodium sulfate and the solution is filtered. The ether is removed and the free amine is obtained in pure form by fractional distillation.

EXAMPLE 9

Tricyclo[3.3.1.0$^{3,7}$]nonan-9-one

Zinc amalgam is prepared by shaking mossy zinc (10 g.) which has been washed with dilute hydrochloric acid in a solution of mercuric chloride (0.5 g.) in 0.25 N hydrochloric acid (25 ml.).

The amalgam is washed with water and refluxed with the bromo ketone of Example 6 (0.283 g.) in acetic acid (50 ml.) and water (2 ml.) for 24 hours. The reaction mixture is filtered, diluted with water and extracted continuously with ether for 3 days. The ether phase is separated and washed with sodium bicarbonate solution, then with water and dried over sodium sulfate. The ether is removed on a rotary evaporator. The residue is extracted with acetone and the soluble portion is obtained by evaporation of the solvent. The desired title product is purified by sublimation.

EXAMPLE 10

Tricyclo[3.3.1.0$^{3,7}$]nonan-9-one oxime

The ketone of Example 9 (1.36 g.) is dissolved in ethanol (50 ml.) and refluxed under nitrogen with hydroxylamine hydrochloride (0.77 g.) and sodium bicarbonate (0.94 g.) for eight hours. The solution is cooled, diluted with water (250 ml.) and acidified with hydrochloric acid to pH 5. The aqueous phase is then extracted with ether (5×100 ml.). After drying the combined ether extracts with sodium sulfate, the solution is filtered and the solvent is removed on a rotary evaporator to give the oxime.

EXAMPLE 11

9-aminotricyclo[3.3.1.0$^{3,7}$]nonane

The oxime of Example 10 (3.02 g.) is dissolved in ether (200 ml.) and refluxed under nitrogen with lithium aluminum hydride (6.0 g.) for eight hours. The solution is cooled and the excess reducing agent is destroyed by treating with ethyl acetate followed by a small amount of water. The suspension is dried with anhydrous sodium sulfate, filtered and the ether evaporated to give a residue. The title amine is obtained in pure form by fractional distillation. The hydrochloride salt is obtained by treating an ethereal solution of the amine with excess ethereal hydrochloric acid. The resultant precipitate is filtered off and recrystallized from methanol-ether to give the desired hydrochloride salt.

EXAMPLE 12

3-acetamidotricyclo[3.3.1.0$^{3,7}$]nonane 3-aminotricyclo[3.3.1.0$^{3,7}$]nonane (2.9 g.) is allowed to stand overnight with 5 g. of acetic anhydride in 100 ml. of pyridine. The reaction mixture is then diluted with ice water and the amide product removed by filtration.

EXAMPLE 13

3-(N-ethylacetamido)tricyclo[3.3.1.0$^{3,7}$]nonane

A solution of 1.79 g. of the amide of Example 12 in 50 ml. of dry tetrahydrofuran is refluxed for 2 hours with 0.45 g. of 53.5% sodium hydride. A solution of 1.56 g. of ethyl iodide in 25 ml. of dry tetrahydrofuran is added to the cooled reaction mixture which is then refluxed for twelve hours. A small amount of water is cautiously added with cooling, the solution is filtered, and most of the tetrahydrofuran evaporated in vacuo. A further quantity of water is added, the alkaline solution is extracted with ether, and the extracts dried and evaporated to give the title product.

EXAMPLE 14

3-diethylaminotricyclo[3.3.1.0$^{3,7}$]nonane

A solution of 2.07 g. of the N-ethylacetamido compound of Example 13 in 100 ml. of dry tetrahydrofuran is refluxed with 0.5 g. of lithium aluminum hydride for 12 hours. The excess hydride is decomposed by the cautious addition of water, with cooling. The solution is filtered, the filtrate extracted with ether, and the ether extracts evaporated to give the diethylamino product.

Reduction of the 3-acetamido compound of Example 12 in the same manner gives the 3-ethylamino compound.

EXAMPLE 15

1-methylaminotricyclo[3.3.0.0$^{3,7}$]octane

Tricyclo[3.3.0.0$^{3,7}$]octane-1-isocyanate (obtained by converting the carboxylic acid of Example 7 into the azide as described in Example 3 and heating the azide in refluxing dry benzene for one half hour) (2.98 g.) is dissolved in 60 ml. of methanol and the solution is then refluxed for 2 hours. The solvent is evaporated in vacuo, 50 ml. of dry tetrahydrofuran is added to the resulting carbamate, and the mixture is refluxed with 0.76 g. of lithium aluminum hydride for four hours. The reaction mixture is decomposed with water and filtered, and the filtrate evaporated to give the title product.

EXAMPLE 16

1-aminomethyltricyclo[3.3.0.0$^{3,7}$]octane

A solution of 4.7 g. of tricyclo[3.3.0.0$^{3,7}$]octane-1-carboxylic acid in 25 ml. of thionyl chloride is refluxed for 2 hours and then allowed to stand overnight at room temperature. The excess thionyl chloride is evaporated in vacuo, the residual oil is taken up in benzene, and the solution further evaporated to give the acid chloride.

This acid chloride is dissolved in 15 ml. of dry tetrahydrofuran and the solution added dropwise to an ice-cold solution of conc. aqueous ammonia (ca. 75 ml.). After stirring for 1 hour, water is added, and the amide either removed by filtration or extracted with an organic solvent.

To a slurry of 3.04 g. of lithium aluminum hydride in 400 ml. of refluxing tetrahydrofuran is added in portions over 1 hour 3.26 g. of this amide, all under nitrogen. The mixture is heated at reflux for 24–48 hours, cooled, and the excess hydride decomposed by the cautious addition of water. The resulting white slurry is filtered, the filter cake washed with ether, and the filtrates combined and evaporated in vacuo to give the title 1-aminomethyltricyclooctane.

EXAMPLE 17

9-aminomethyltricyclo[3.3.1.0$^{3,7}$]nonane

A stirred suspension of 40 g. (.105 mole) of methoxymethyl triphenylphosphonium chloride in 200 ml. of tetrahydrofuran and 200 ml. of diglyme is treated dropwise with 105 ml. (.10 mole) ethereal n-butyl lithium in a nitrogen atmosphere, and the mixture allowed to stir for 3 hours at 25°. To the resulting solution is added dropwise a solution of 6.8 g. (.05 mole) of tricyclo [3.3.1.0$^{3,7}$]nonan-9-one in 40 ml. each of tetrahydrofuran and diglyme. After stirring for 4 hours at 25°, the tetrahydrofuran is removed by heating on the steam bath, 200 ml. of diglyme is added, and the mixture is refluxed for 7 hours. The mixture is cooled, concentrated to one-half volume in vacuo, and treated with methyl bromoacetate to remove any triphenylphosphine. After standing 12 hours, the solid is filtered off, the filtrate washed with water, and the dried organic layer evaporated to give an oil. Column chromatography over alumina gives the 9-methoxymethylene compound.

This vinyl ether is allowed to stand for 15 minutes at room temperature in a saturated solution of ether in perchloric acid, poured into aqueous sodium bicarbonate and extracted with ether. Evaporation of the dried ether extracts gives the 9-carboxaldehyde.

To a solution of 18.75 g. of hydroxylamine hydrochloride in 75 ml. of water and 75 ml. of 10% aqueous sodium hydroxide is added a solution of 7.7 g. of the 9-aldehyde in 100 ml. of 95% alcohol. The mixture is heated at 70–80° for 15 minutes, filtered hot, and then diluted with 350 ml. of cold water. The precipitate is collected and dried to give the 9-oxime.

To a slurry of 3.5 g. of lithium aluminum hydride in 300 ml. of refluxing tetrahydrofuran is added over 20 minutes a solution of 6.6 g. of the 3-oxime in 150 ml. of tetrahydrofuran. The mixture is heated at reflux for 3 hours, cooled, and the excess hydride decomposed by cautious addition of water. The resulting white slurry is filtered, the filter cake washed with ether, and the combined filtrates dried and evaporated to give the title 9-aminomethyltricyclononane.

EXAMPLE 18

9-dimethylaminotricyclo[3.3.1.0$^{3,7}$]nonane 9-aminotricyclo[3.3.1.0$^{3,7}$]nonane (1.5 g.) is mixed with 0.5 mole of 90% formic acid and 0.22 mole of 35% formaldehyde solution. The mixture is heated for 12 hours on the steam bath, 50 ml. of conc. hydrochloric acid is then added, and the mixture evaporated to dryness in vacuo. To the residue is added 200 ml. of 1 N sodium hydroxide. The product is obtained by extraction with ether and drying and evaporating the ether.

EXAMPLE 19

α,α-Dimethyltricyclo[3.3.0.0$^{3,7}$]octane-1-methylamine

To a solution of 28 g. of tricyclo[3.3.0.0$^{3,7}$]octane-1-carboxylic acid chloride (Example 8) in 500 ml. of anhydrous ether under a nitrogen atmosphere is added dropwise 150 ml. of commercial 3 M methyl magnesium bromide at a rate which maintains a gentle reflux. The reaction mixture is heated for 1 hour after the addition, then cooled. To decompose the metal complex, 300 ml. of saturated ammonium chloride is added. The ether layer is separated and the aqueous layer is extracted with 100 ml. of chloroform. This extract is combined with the ether layer, and the mixture is dried with anhydrous magnesium sulfate and vacuum-concentrated to dryness at 35° C. The residue is steam-distilled until the distillate is no longer milky, about 3 liters of distillate being collected. After cooling, the steam distillate is extracted with two 250 ml. portions of ether, which are combined, dried with anhydrous magnesium sulfate, and vacuum concentrated to yield α,α-dimethyltricyclo[3.3.0.0$^{3,7}$]octane-1-methanol.

A 35 ml. amount of concentrated sulfuric acid is added dropwise, with cooling to hold the temperature below 10° C., to 160 ml. of acetonitrile. Then, 18.6 g. of the above alcohol is added. The temperature is raised to 48° C. and maintained at 48° C. for 45 minutes. The reaction mixture is allowed to cool to room temperature and is then slowly poured into 1000 ml. of ice water. The solids which separate are filtered and dried and then taken up in 500 ml. of ether. Dry hydrogen chloride is bubbled into the ether solution until no further precipitation occurs. The solids are filtered, dried, and placed in a separatory funnel containing 200 ml. of water and 500 ml. of ether. This is shaken until the solids dissolve, and the aqueous layer is separated and discarded. The ether solution is dried with anhydrous sodium sulfate and concentrated to dryness to give N-acetyl-α,α-dimethyltricyclo [3.3.0.0$^{3,7}$]octane-1-methylamine. A mixture of 2.0 g. of this N-acetyl compound, 10 g. of potassium hydroxide, and 40 ml. of methanol is heated at 225° C. in a sealed tube for 18 hours, then cooled. The tube contents are added to 100 ml. of water, and the mixture is extracted with two 50 ml. portions of ether. The extracts are combined, dried with potassium hydroxide pellets, and the ether removed to give the title product. To prepare a hydrochloride salt, dry hydrogen chloride is bubbled into an ether solution of the amine until precipitation is complete. The precipitate is filtered off, dried and recrystallized to give the hydrochloride salt of the title product.

EXAMPLE 20

α-Methyltricyclo[3.3.1.0$^{3,7}$]nonane-3-methylamine

Tricyclo[3.3.1.0$^{3,7}$]nonane-3-carboxylic acid (4.9 g., 0.0295 mole, Example 2) is dissolved in 100 ml. of dry tetrahydrofuran and, with stirring under nitrogen, 31 ml. (0.062 mole) of 2 N methyl lithium in ether is added over 3 to 4 minutes. The mixture is refluxed overnight and cooled to room temperature. Water (25 ml.) is added, and the product extracted into ether. After drying over magnesium sulfate, the ether is removed to yield tricyclo [3.3.1.0$^{3,7}$]oct-1-yl methyl ketone.

To a mixture of 5.72 g. of the above ketone, 3.22 g. (0.0463 mole) of hydroxylamine hydrochloride, and 15 ml. of ethanol are added, portionwise with stirring, 3 ml. of water and 5.9 g. (0.147 mole) of powdered sodium hydroxide. The reaction mixture is stirred and refluxed for 5 minutes and then poured into an ice cold solution of 20 ml. (0.240 mole) of concentrated hydrochloric acid in 110 ml. of water. The colorless solid is filtered off and washed with water. After drying over phosphorous pentoxide, the oxime is obtained.

A solution of 3.80 g. of the above oxime in 50 ml. of tetrahydrofuran is added to a stirred suspension of 2.93 g. (0.077 mole) of lithium aluminum hydride in 75 ml. of ether. The mixture is stirred and refluxed overnight. After cooling to room temperature, 7 ml. (7.0 g., 0.0389 mole) of water are added dropwise, and the mixture stirred 1 hour at room temperature. The solid is filtered off and washed well with ether. The ether is dried with solid potassium hydroxide and then with magnesium sulfate, and the product is obtained by evaporation. The hydrochloride salt is precipitated with gaseous hydrogen chloride. The hydrochloride is filtered off, washed with ether, and then recrystallized.

Use of an equivalent of ethyl lithium, propyl lithium, or butyl lithium in the above procedure gives the corresponding α-ethyl, α-propyl, or α-butyl products.

EXAMPLE 21

α,α - Dimethyltricyclo[3.3.1.0$^{3,7}$]nonane - 9 - methylamine and α-lower alkyltricyclo[3.3.1.0$^{3,7}$]nonane-9-methylamines are prepared from tricyclo[3.3.1.0$^{3,7}$] nonane-9-carboxylic acid chloride and -9-carboxylic acid, respectively, by the procedures of Examples 19 and 20. The starting materials are prepared by oxidation of the aldehyde of Example 17 with silver nitrate as described in J. Org. Chem. 30, 1061 at 1068 (1965) and, in the case of the acid chloride, reaction with thionyl chloride.

EXAMPLE 22

1-aminotricyclo[3.3.0.0$^{3,7}$]octane

A solution of 20.0 g. (0.0773 mole) of 1-bromo-9-ketotricyclo[3.3.1.0$^{3,7}$]nonane-3-carboxylic acid in 150 ml. of methanol is neutralized with ca. 55 ml. of 10% KOH and adjusted to pH 6 with 3 N HNO$_3$. To this cooled and stirred solution is slowly added a solution of 13.15 g. (0.0773 mole) of AgNO$_3$ in 40 ml. of methanol and 20 ml. of water. After cooling, the solid is collected, washed with methanol, dried, pulverized, and further dried.

This silver salt (10.7 g., 0.029 mole) is added to a solution of 5.6 g. (0.035 mole) of Br$_2$ in 35 ml. of dry carbon tetrachloride, and the solution stirred for one-half hour at room temperature, evolution of heat and gas being observed. The solution is then refluxed for 4 hours, cooled, and the solid collected, washed with carbon tetrachloride, and dried. The filtrate is evaporated in vacuo and the combined solids are extracted with chloroform in a Soxhlet apparatus for 2 days. The chloroform extracts are evaporated and the solid residue stirred with 50 ml. of saturated NaHCO$_3$ solution for several hours. The insoluble material is collected, dried, and chromatographed on Woelm (Neutral II) alumina (16×150). The material is placed on the column with 25 ml. of benzene and eluted with 275 ml. of benzene, the resulting compound being 1,3-dibromotricyclo[3.3.1.0$^{3,7}$] nonan-9-one, M.P. 133.5–134.5°.

To this dibromoketone (1.52 g., .0052 mole) is added 3.8 g. of KOH in 5 ml. each of ethanol and water under nitrogen. The mixture is refluxed 4 hours, cooled, and acidified with 3 N HCl. The acidic solution is extracted with chloroform, and the chloroform extracts are dried and evaporated. The residue is dissolved in ether and cyclohexylamine added in slight excess. The salt is collected, washed, and dried, and dissolved in methanol. The methanol solution is stirred with charcoal, filtered through a filter aid, washed, and evaporated. The solid is suspended in 25 ml. of water, acidified with 3 N HCl, and the solid collected and washed with water. This compound is 3-bromotricyclo[3.3.0.0$^{3,7}$] octane-1-carboxylic acid.

To a mixture of 0.882 g. (0.0038 mole) of the above bromo acid, 4.6 g. (0.0062 mole) of dry tert-butanol, and 30 ml. of dry tetrahydrofuran under nitrogen is added 0.44 g. (0.0062 mole) of Li metal in small pieces. The mixture is stirred at room temperature for ca. 10 minutes, refluxed for one-half hour, and then allowed to cool. The solution is poured over ca. 300 g. of ice, acidified with 3 N HCl, and the acidic solution extracted with ether. The ether extracts are washed, dried, and evaporated to give an oil which is then dissolved in a small amount of ether and converted to the cyclohexylamine salt. The salt is filtered off, washed with ether, suspended in water, and 3 N HCl is added. Ether extraction of the acidic mixture gives tricyclo[3.3.0.0$^{3,7}$]octane-1-carboxylic acid.

The above acid (200 mg., 1.32 mmoles) is dissolved in 10 ml. of dry ether and stirred with 0.2 ml. of $SOCl_2$ and a trace of pyridine for one-half hour at room temperature and then refluxed for 45 minutes. The solvent is evaporated, the excess $SOCl_2$ being removed with the aid of benzene. The residual oil is dissolved in 25 ml. of dry acetone, cooled to 3°, and 0.10 g. of $NaN_3$ in 2 ml. of water added slowly. The solution is stirred for one-half hour with cooling and then poured into 150 ml. of ice water. The aqueous solution is extracted with benzene, and the benzene extracts washed, dried, filtered, and then refluxed one and one-half hours under a Dean-Stark trap. The benzene solution is evaporated, the resulting oil dissolved in 20 ml. of acetone, 2 ml. of concentrated HCl added, and the solution refluxed 1 hour. The solution is cooled, 30 ml. of water is added, the acetone is evaporated, and the aqueous solution extracted with ether. The aqueous solution is made basic with 10% NaOH and extracted with ether. The ether extracts are washed, dried, and evaporated to give the title product. The hydrochloride salt is prepared by adding to a concentrated ethereal solution of the base ethereal HCl, and recrystallizing the salt from isopropanol-ether.

I claim:
1. A compound of one of the following formulas:

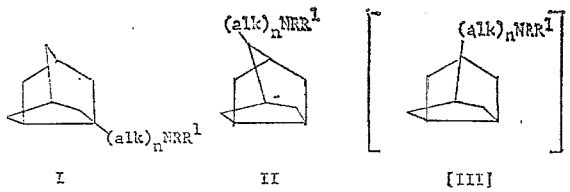

I   II   [III]

or a pharmaceutically acceptable acid addition salt thereof, wherein:
R is hydrogen or lower alkyl;
R$^1$ is hydrogen or lower alkyl;
n is 0 or 1;
alk is $CH_2$, $$\begin{array}{c} CH_3 \\ | \\ C \\ | \\ CH_3 \end{array}$$

or $$\begin{array}{c} R^2 \\ | \\ CH \end{array}$$

and R$^2$ is lower alkyl of 1 to 4 carbon atoms.

2. A compound as claimed in claim 1, in which the compound has the Formula I.
3. A compound as claimed in claim 1, in which the compound has the Formula II.
4. A compound as claimed in claim 2, in which R and R$^1$ are hydrogen or methyl, R$^2$ is methyl, alk is $CH_2$ or $$\begin{array}{c} R^2 \\ | \\ CH \end{array}$$

and the salt is the hydrochloride.
5. A compound as claimed in claim 3, in which R and R$^1$ are hydrogen or methyl, R$^2$ is methyl, alk is $CH_2$ or $$\begin{array}{c} R^2 \\ | \\ CH \end{array}$$

and the salt is the hydrochloride.
6. A compound as claimed in claim 4, in which R and R$^1$ are hydrogen and n is 0.
7. A compound as claimed in claim 5, in which R and R$^1$ are hydrogen and n is 0.

References Cited

UNITED STATES PATENTS 3,256,329  6/1966  Kauer _____ 260—563

OTHER REFERENCES

Sauers et al., Chem. Ab., vol. 61, p. 587a.

ROBERT V. HINES, Primary Examiner

U.S. Cl. X.R.

424—325; 260—340.9, 349, 430, 453, 482, 501.1, 501.12, 514, 544, 557, 561, 566, 586, 598, 606.5, 611, 617, 648

PO-1050
(5/69)

UNITED STATES PATENT OFFICE
CERTIFICATE OF CORRECTION

Patent No. 3,496,228  Dated February 17, 1970

Inventor(s) John R. E. Hoover

It is certified that error appears in the above-identified patent and that said Letters Patent are hereby corrected as shown below:

In claim 1, delete the following formula and Roman numeral together with the enclosing brackets:

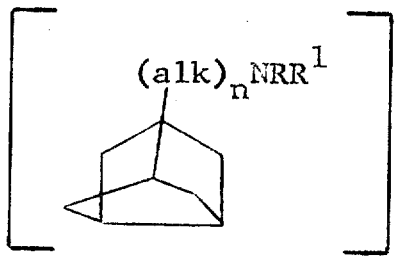

[III]

SIGNED AND
SEALED

JUL 7 1970

(SEAL)
Attest:

Edward M. Fletcher, Jr.
Attesting Officer

WILLIAM E. SCHUYLER, JR.
Commissioner of Patents